United States Patent
Wu et al.

(10) Patent No.: US 6,594,398 B1
(45) Date of Patent: Jul. 15, 2003

(54) METHOD AND APPARATUS FOR RUN-LENGTH ENCODING VIDEO DATA

(75) Inventors: Tony H. Wu, Milpitas, CA (US); Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/535,063

(22) Filed: Mar. 23, 2000

Related U.S. Application Data

(63) Continuation-in-part of application No. 09/421,425, filed on Oct. 19, 1999, now abandoned, which is a continuation of application No. 09/263,442, filed on Mar. 5, 1999.
(60) Provisional application No. 60/077,054, filed on Mar. 6, 1998.

(51) Int. Cl.[7] .................................................. G06K 9/36
(52) U.S. Cl. ..................... 382/245; 382/251; 375/240.03
(58) Field of Search ................................. 382/232–251; 375/240.01, 240.2; 341/63–67

(56) References Cited

U.S. PATENT DOCUMENTS

| | | | | |
|---|---|---|---|---|
| 5,022,088 A | * | 6/1991 | Hisada et al. ................ 382/235 |
| 5,227,878 A | * | 7/1993 | Puri et al. ............... 375/240.15 |
| 5,347,310 A | * | 9/1994 | Yamada et al. ......... 375/240.03 |
| 5,402,123 A | * | 3/1995 | Jung ............................ 341/63 |
| 5,452,104 A |   | 9/1995 | Lee |
| 5,530,478 A | * | 6/1996 | Sasaki et al. ........... 375/240.04 |
| 5,870,145 A | * | 2/1999 | Yada et al. ............. 375/240.04 |
| 6,198,849 B1 | * | 3/2001 | Fischer ........................ 382/250 |
| 6,233,282 B1 | * | 5/2001 | Guerrera ................. 375/240.25 |
| 6,266,375 B1 | * | 7/2001 | Chang et al. ............. 375/240.3 |

* cited by examiner

Primary Examiner—Jingge Wu
(74) Attorney, Agent, or Firm—Townsend and Townsend and Crew LLP

(57) ABSTRACT

New and improved methods and apparatus for run-length encoding video data. These techniques are especially suited to digital video applications, in which input to a video decoder is generated in order to determine run lengths and amplitudes. The implementations are suitable for widely-used image compression standards that integrate various algorithms into a compression system, such as the standards specified in the Digital Video Standard (the "Blue Book").

12 Claims, 9 Drawing Sheets

METHOD AND APPARATUS FOR RUN-LENGTH ENCODING VIDEO DATA

CROSS-REFERENCES TO RELATED APPLICATIONS

This application is a continuation-in-part and claims priority from U.S. patent application Ser. No. 09/421,425 now abandoned, filed Oct. 19, 1999, which is a continuation and claims priority from U.S. patent application Ser. No. 09/263,442, filed Mar. 5, 1999, which claims priority from U.S. Provisional Patent Application No. 60/077,054, filed Mar. 6, 1998, all of which are incorporated herein by reference in their entireties for all purposes.

BACKGROUND OF THE INVENTION

The present invention relates to the field of image processing. More specifically, the present invention relates to methods and apparatus for run-length encoding video data. These techniques are especially suited for digital video (DV) applications, in which input to a video encoder is run-length encoded. The implementations are suitable for widely-used image compression standards that integrate various algorithms into a compression system, such as the standards specified in the DV standard (DV-SD or the "Blue Book"), which is included herein by reference in its entirety.

In a traditional video compression scheme, a video encoder applies a discrete cosine transform (DCT) to transform the DCT coefficient data in each video block into frequency-domain coefficients. Every video block generally consists of an 8×8 block of DCT coefficients. In order to increase the compression ratio, all the coefficients are weighted with certain weighting quantization numbers. After the weighting, many of the coefficients will be truncated to zero and/or the dynamic ranges of the coefficients will be reduced. This will improve the compression ratio.

In particular, in run-length encoding the repetitive nature of an image is exploited to provide compression. Run-length encoding detects "runs" of the same value, encodes the image, and provides a sequence of "length-of-run" and "value" (or amplitude). Accordingly, run-length encoding is error free (i.e., lossless) compression. Since the weighting stage will truncate many of the coefficients to zero and/or the dynamic ranges of the coefficients will be reduced, the compression ratio can be significantly increased because the run count in the run-length coding is increased. This can replace the zeros appended at the end of the end of block (EOB) token. Usually, the compression ratio will range from 3 to 20.

In the DV system, the situation is different. The compression ratio is expected at around 5:1, which means excessive truncations are unnecessary. In order to maintain a constant ratio, the compression ratio is confined at the video segment level. Each video segment consists of five macro blocks and each macro block contains four (4) 8×8 Y-blocks, one (1) 8×8 U-block, and one (1) 8×8 V-block. With a fixed amount of data to store the encoding bitstream for all 30 blocks in each video segment, this scheme will allow some blocks using longer bitstream to achieve better encoding results. At the same time, some blocks will be able to keep reasonably good quality using short bitstreams. Overall both high compression ratio and high quality are expected to be achieved at the same time.

What is therefore desired is a technique which provides acceptable compression levels for varying types of video data such as ever-changing scenery. Moreover, a technique of this type should provide efficient use of space when implemented in an integrated circuit. Also, the implementation should provide an acceptable level of computational accuracy to provide image quality.

SUMMARY OF THE INVENTION

The present invention solves the problems associated with the prior art by providing methods and apparatus for efficiently and accurately compressing video data. In one embodiment, a video encoder for run-length encoding video data is provided. The video encoder includes a length-decision coder and a code-decision coder. The length-decision coder can be configured to receive the video data and provide length information based on a selected group of quantization factors. The code-decision coder can be configured to receive a plurality of best fit quantization factors and run-length encode the video data.

In another embodiment, the code-decision coder and the length-decision coder can be coupled to a smart encoder. The smart encoder can be configured to receive the length information and select the plurality of best fit quantization factors.

In a further embodiment, the selected group of quantization factors is selected in accordance with the DV Standard.

In yet another embodiment a method of encoding video data is disclosed. The video data includes a plurality of DCT coefficients. The method includes simultaneously analyzing two DCT coefficients of video data, determining a run length for the two DCT coefficients being analyzed, and storing the run length. If both of the two DCT coefficients have a value of zero, then the run length is increased by two. If the first DCT coefficient has a value of zero and the second DCT coefficient has a value of one, then the run length is restarted at one. If the second DCT coefficient has a value of zero and the first DCT coefficient has a value of one, then the run length is incremented by one. Alternatively, if both of the two DCT coefficients have a value of one, then the run length is set to zero.

In a different embodiment, a method of looking up length codes from a plurality of tables is disclosed. The method includes receiving input data, quantizing the input data, and providing a large VLC length table capable of providing length information based on run count and amplitude of the quantized input data. If both a valid run count and amplitude of the quantized input data can be provided for the quantized input data, a length code is looked up from the large VLC length table. The method further provides a run VLC length table capable of providing length information based on run count of the quantized input data. If only a valid run count of the quantized input data can be provided for the quantized input data, a length code is looked up from the run VLC length table. The method also includes providing an amplitude VLC length table capable of providing length information based on amplitude of the quantized input data. If only a valid amplitude of the quantized input data can be provided for the quantized input data, a length code is looked up from the amplitude VLC length table. The method additionally includes combining the length codes looked up from the amplitude VLC length table and the run VLC length table. The method provides a final length code based on whether both a valid run count and amplitude of the quantized input data can be provided for the quantized input data.

In yet a further embodiment of the present invention, an innovative two-DCT coefficient scanning technique and a (relatively small) scratch memory to store EOB locations are provided. The two-DCT coefficient scanning scheme increases the performance up to two-fold. When the lower DCT coefficient value is zero, the factor of two increase in performance is maintained. The small scratch memory (e.g., a 30×33 bit RAM memory) can be used to store the DCT type (1 bit) and class number (2 bits) of each block in one video segment.

These and other embodiments of the present invention, as well as, its advantages and features are described in more detail in conjunction with the text below and attached figures.

DESCRIPTION OF THE SPECIFIC EMBODIMENTS

Figure 1:
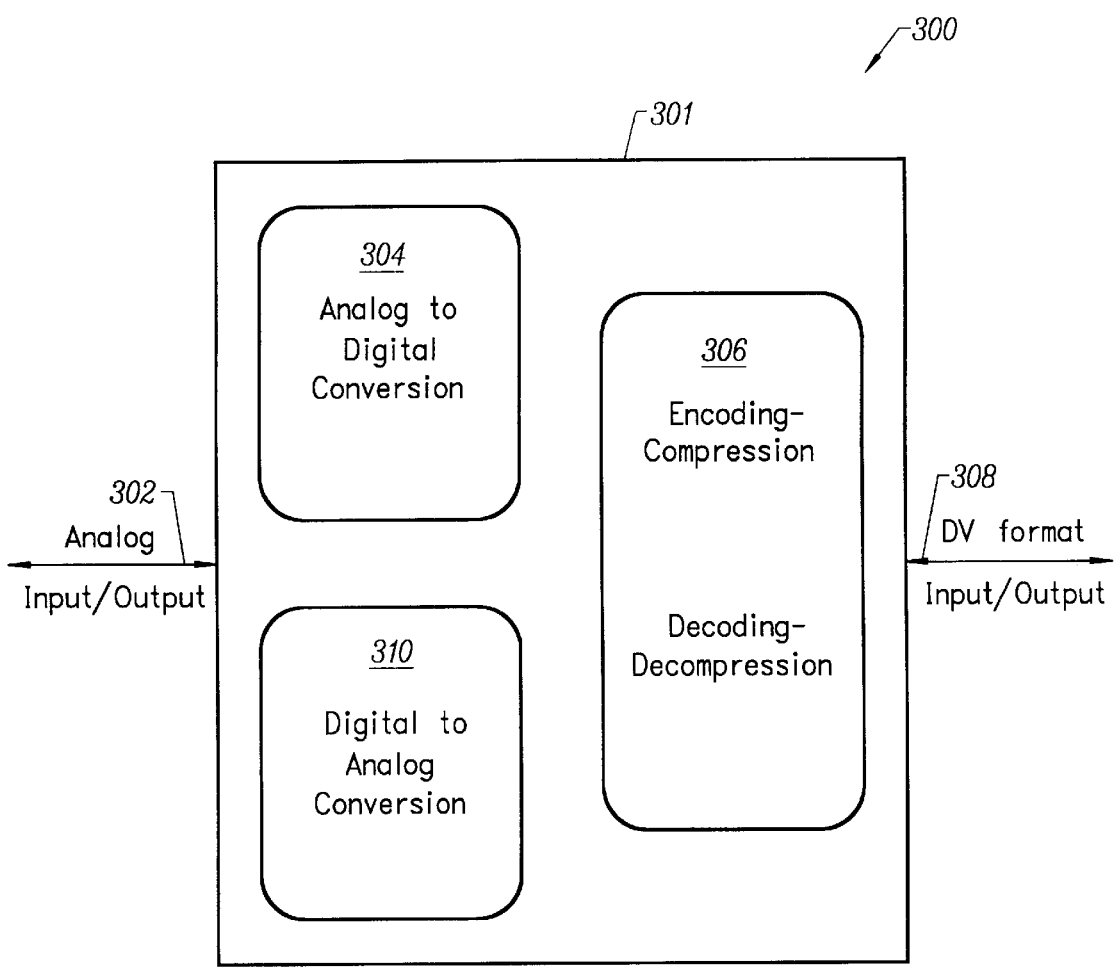
FIG. 1 illustrates a simplified block diagram of a system 300 in accordance with the present invention.

In the description that follows, the present invention will be described in reference to a preferred embodiment for run-length encoding. More specifically, examples will be described which illustrate particular features of the invention. The present invention, however, is not limited to any particular features nor limited by the examples described herein. Therefore, the description of the embodiments that follow are for purposes of illustration and not limitation. Also, elements appearing in a given figure which were introduced in previous figures are referred to with the same reference numerals which were originally used.

FIG. 1 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the A/D converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or on two separate chips.

Figure 2:
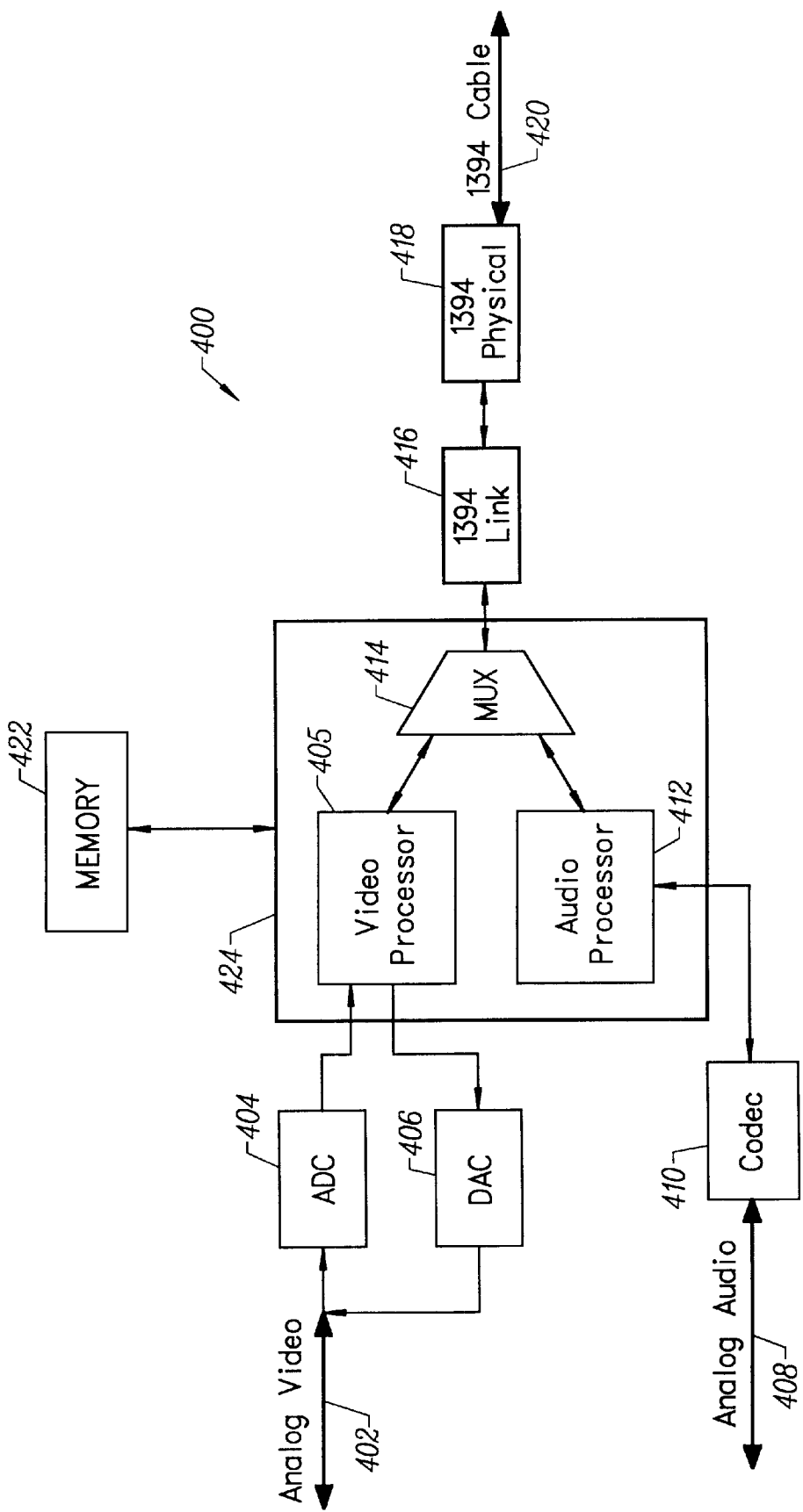
FIG. 2 illustrates a more detailed illustration of block 301 of FIG. 1.

FIG. 2 illustrates a system 400. The system 400 is a more detailed illustration of block 301 of FIG. 1. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments®. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PDI1394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 2 also illustrates a memory 422 which can be any type of storage such as dynamic random access memory (DRAM), extended output DRAM (EDO DRAM), synchronous DRAM (SDRAM), video RAM (VRAM), static RAM (SRAM), and the like. The memory 422 provides storage for devices within system 400 including storage for functions performed within block 424, such as ftuctions performed by the video processor 405 and the audio processor 412. Additionally, some elements of the system 400 can have their own local memory.

Figure 3:
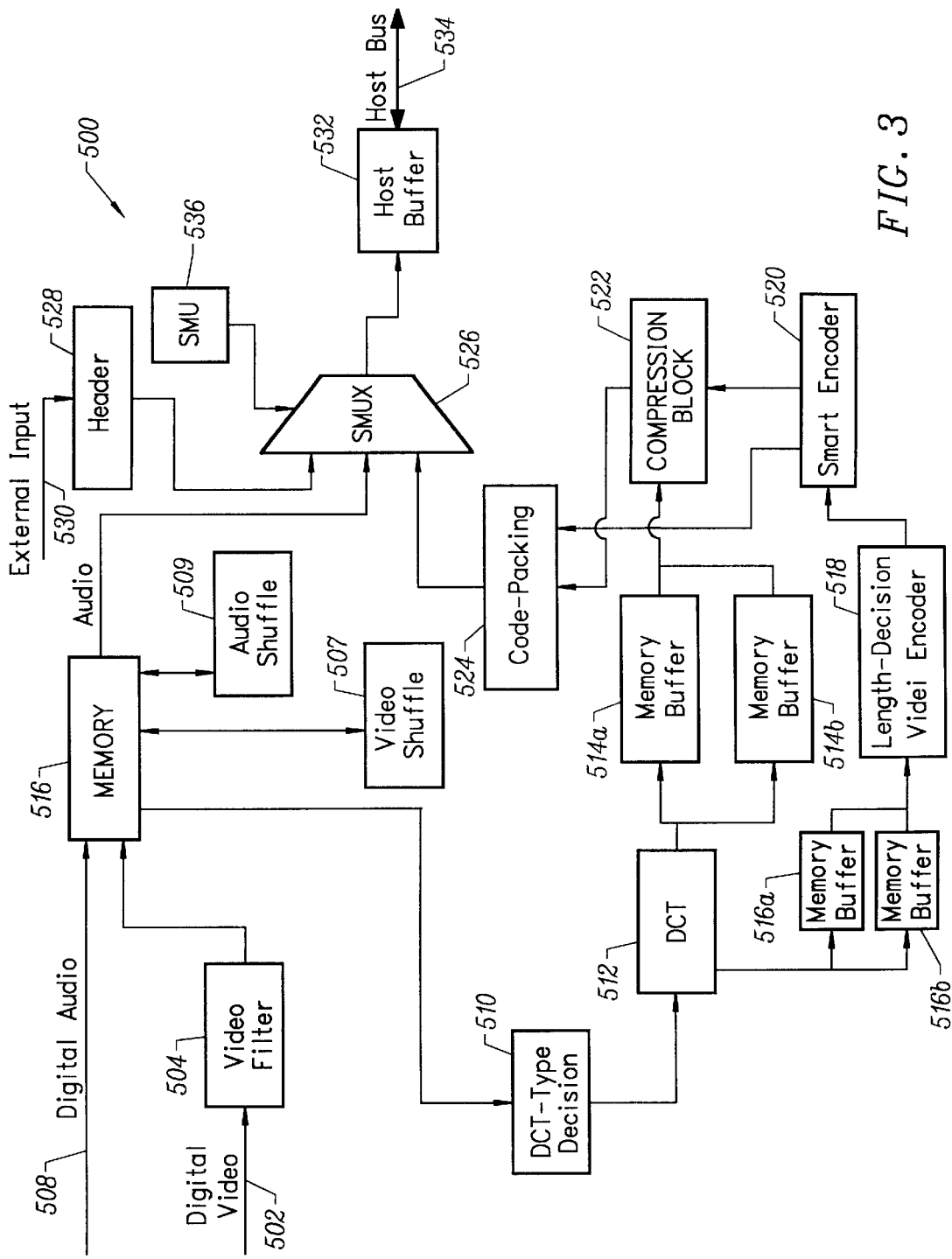
FIG. 3 illustrates a more detailed block diagram of the coding-compression block 306 of FIG. 1.

FIG. 3 illustrates a system 500. The system 500 is a more detailed block diagram of the coding-compression block 306 of FIG. 1. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format. For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 500. Additionally, some elements of the system 500 can have their own local memory.

The video data stored in memory 506 can be retrieved by DCT-type decision block 510 (where DCT is discrete cosine transform). The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b and 516a–b. The memory buffers 514a–b can be identical. Similarly, the memory buffers 516a–b can be identical. The memory buffers 514a–b preferably store 1 k×20 bits of data. Memory buffers 516a–b preferably store 64×10 bits of data. Such a configuration will allow storage of one video segment in each of the memory buffers 514a–b. As detailed above, each video segment includes five (5) macro blocks and each macro block includes six (6) blocks of 8×8 DCT coefficients. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the 0th 8×8 block is stored in the memory buffer 516a, the 1st block of the 8×8 block data is stored in the memory buffer 516b. Similarly, the 2nd 8×8 block is stored in the memory buffer 516a and the 3rd 8×8 block of data is stored in the memory buffer 516b. The 8×8 blocks stored in the memory buffers 516a–b are input into a length-decision video encoder 518. The length-decision video encoder 518 receives the frequency-domain DCT coefficient information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0,1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 can also provide information to a code packing block 524. Such information can, for example, include length information, selected Q-numbers, class numbers, DCT-type, and the like. The length information includes data about length of data stored in each macro block. The code packing block 524 receives the compressed data from compression block 522 and the macro block length information from smart encoder 520. The code packing block 524 arranges video data efficiently into a bitstream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 500 and output at node 534.

Figure 4:
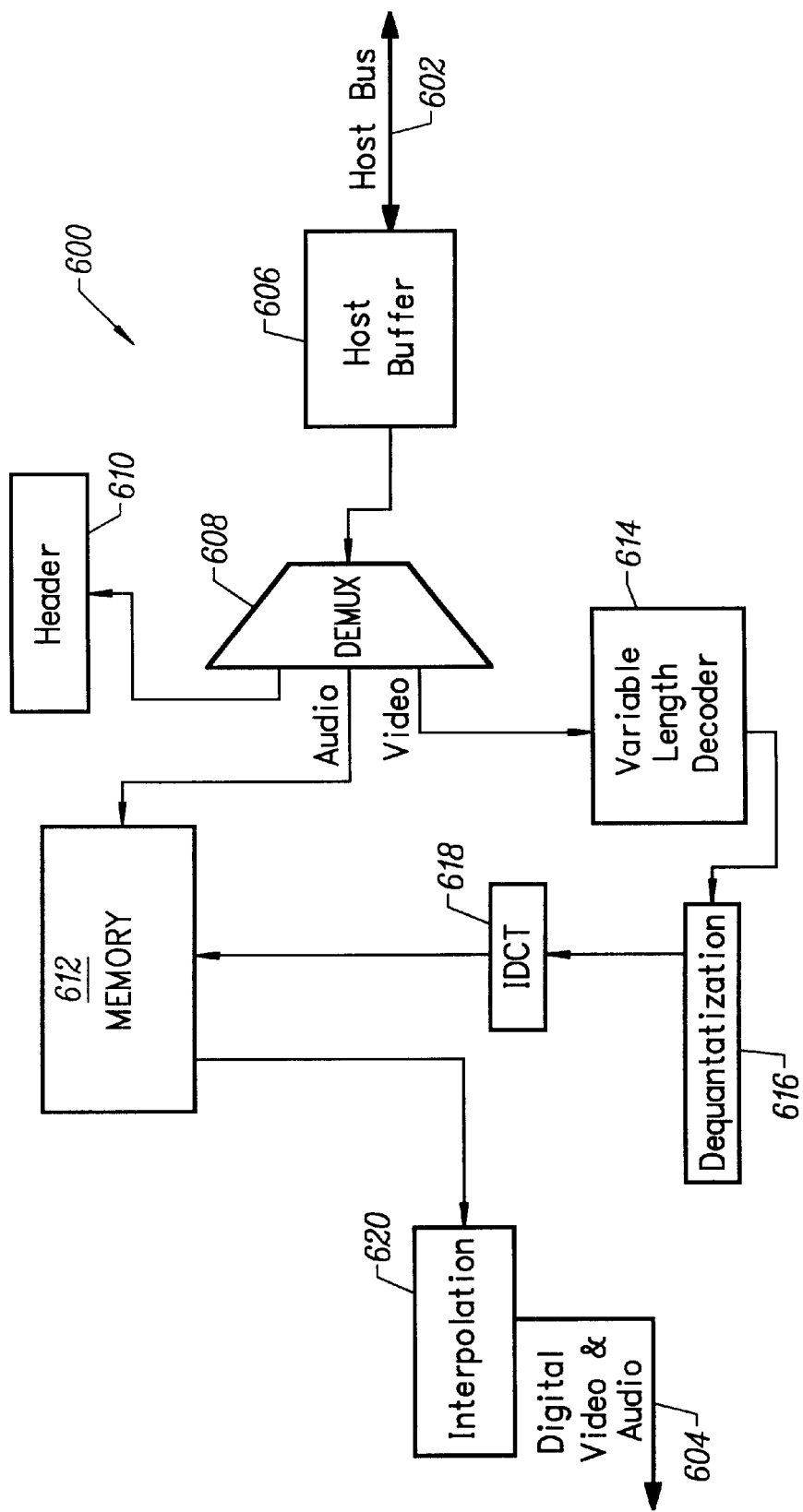
FIG. 4 illustrates a simplified block diagram of a system for converting DV data to digital data.

FIG. 4 illustrates a simplified block diagram of a system 600 for converting DV data received at a host node 602 to digital audio and video data which are respectively output at a digital audio node 603 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bitstream data to bitstreams for each video block and provide these unpacked blocks of data to a video decoder 624. The video decoder 624 receives 16 bit data and decodes the bitstream into individual DCT coefficient values. The video decoder 624 includes a variable length decoder 614 and a dequantization block 616. The variable length decoder 614 decodes the DV video data in accordance with variable length decoding techniques. The output of variable length decoder 614 is coupled to the dequantization block 616 which dequantizes the DV bitstream in accordance with embedded dequantization factors. The dequantization block 616 is coupled to an inverse DCT (IDCT) block 618 which is configured to perform inverse discrete cosine transformation on the dequantized bitstream. The IDCT operation converts data from the frequency domain to the spatial domain. In an alternative embodiment of the present invention, two memory buffers (not shown) can be coupled between the dequantization block 616 and the IDCT block 618. In such an embodiment, the memory buffers are RAMs, each having a storage capacity of 1 k×20. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

Further to the discussion of FIG. 3, the smart encoder 520 can be configured to dynamically adjust the weighting numbers in accordance with the characteristics of data within the blocks in each video segment. Those weighting numbers (Wn) can be selected as a function of the DCT type (8×8 or 2×4×8), block class (0,1, 2, and 3), coefficient location (P(I,j)), and/or quantization number (Qn). The type of DCT to be used can be determined according to the field-correlation result (i.e., a determination of the amount of high-frequency components existing in each block) and block class can be determined by the range of the AC coefficients after DCT transformation is performed. Thus, those two variables can be already known at the time the DCT transformation is finished. In the DV standard, the coefficient location is not variable, so the only variable that can be manipulated for the smart encoder 520 is the quantization number (Qn).

As discussed before, the quantization number can be an index ranging from 0 to 15. Usually, Qn=0 will lead to smaller weighting coefficients (closer to zero) and Qn=15 will yield weighting coefficients closer to one (1). The smart encoder 520 will not be able to make the best selection before it knows how the weighting coefficients will effect the length of the encoding bitstream. One of two methods can be used. First, one can either remember every bitstream the run-length encoder (RLE) ever generates and choose one. Second, the run-length encoding (RLE) may be run twice, where the first run generates the lengths and the second run generates the actual encoded bitstream.

The first method, which remembers all the possible results, is often not cost-effective in hardware implementations. For example, an unpredictably long bitstream may need to be stored which would require including multiple 47.5 Kbits of memory. Accordingly, this method would demand much more memory capacity than an application involving the second method. The second method can be more beneficial in certain situations because only the length for each possible Qn for each block needs to be stored. For the latter example, only 1.5 K bits of memory are required, where 1.5 K bits is the result of (30 total blocks)×(five Q-numbers)×(10 bits to store the length for each block).

To distinguish the two passes, i.e., runs, of the second method, the first one is referred to herein as the length-decision coder (LDC) and the second pass is referred to herein as the code-decision coder (CDC). In one embodiment in accordance with the present invention, the LDC can be performed by the length-decision video encoder 518 and the CDC can be performed by the compression block 522, both of FIG. 3.

Figure 5:
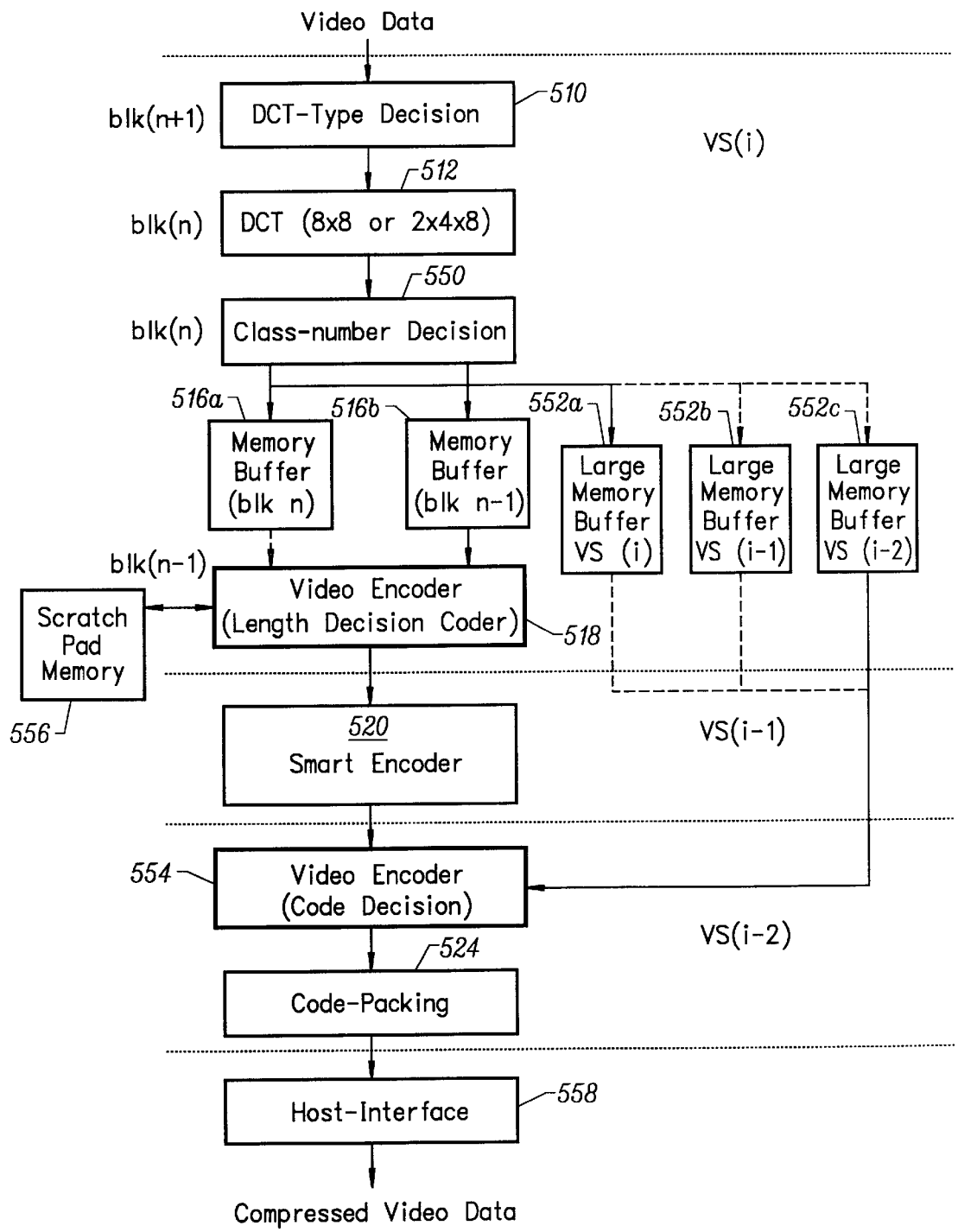
FIG. 5 illustrates a block diagram of an encoding pipeline requiring three (3) video segment stages.

The two-pass scheme may raise a memory usage issue regarding the video pipeline. This issue can be further discussed with respect to FIG. 5. On the top, FIG. 5 shows the first stage which involves the DCT module and the LDC module. A class-number decision block 550 is shown which can be configured to pick class numbers in accordance with the DV standard. The class number information may be initiated by the DCT block 512 or alternatively passed along with the video data. With respect to memory blocks 552a–c, VS(i) indicates that the stage is working the i-th video segment. Similarly, blk(n) indicates that the module is working on the n-th block. The "+1" and "−1" indicate next and previous, respectively. The memory blocks 552a–c can be selected to be similar to the memory blocks 514a–b.

In one embodiment, at the normal running mode where the clock is about 27 MHz, there can be about 3,250 cycles duration for processing each video segment. At a given instance, it can be seen that the first stage can be working on the i-th video segment, where the DCT block 512 works on block (n) and the LDC (the length-decision video encoder 518) works on block (n-1). All DCT coefficients can be written to the memory blocks 552a–c as well as into the memory blocks 516a–b. At the same time, the smart encoder 520 can handle the lengths generated by the LDC 518 and decide which combination is the best fit. A CDC 554 can encode the DCT coefficients for video segment (i-2) based on the smart encoder's output and send the bitstream to the code-packing module 524 to pack them into, for example, 16-bit words. The code-packing module 524 provides its output to a host interface 558 which outputs the compressed video data.

As discussed before, in order to reduce the duplication of operations by the LDC, five preset quantization numbers (e.g., 0, 3, 7, 11, 15) can be selected. LDC will only calculate the encoding bitstream length using these five Qn's. Therefore the smart encoder will only pick Qn for each block from these five numbers. Of course, a different number of possible Qn's can also be used in implementing the present invention. The number of possible Qn can be, for example, dependent on cost issues and the integrated circuit area that is available.

Since the smart encoder 520 may require a relatively large number of cycles (e.g., around 1,000 cycles) to determine the best selection of quantization numbers and the CDC module may need no less than number of DCT coefficients× Qn's×bits/location (e.g., 64×5×6=1,920) cycles to scan through the DCT coefficients. Those with ordinary skill in the art would understand that the smart encoder 520 can be implemented in one video pipeline stage and the CDC in another stage with, for example, the compression block 522 such as illustrated in FIG. 3. This configuration can be further improved because it entails the use of another large memory buffer (19.2 Kbits for above example) just to store the DCT coefficients.

Figure 6:
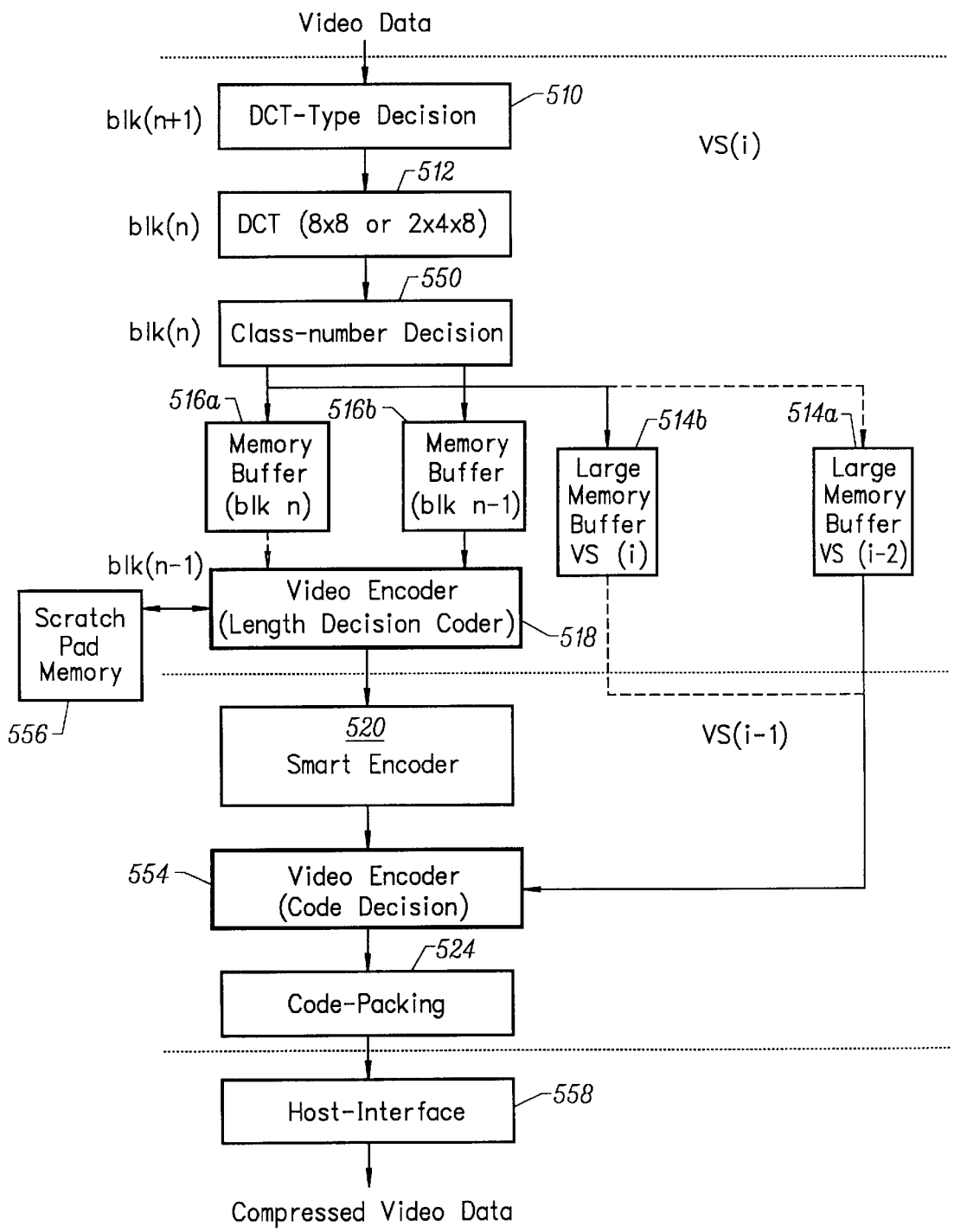
FIG. 6 illustrates a block diagram an encoding pipeline that requires two (2) video segment stages.

In one embodiment, in order to eliminate the need for the additional large buffer, the second and the third video segment stage can be combined into one stage as shown in FIG. 6, for example. Because the total number of cycles for the smart encoder 520 and the CDC 554 is already approaching 3,000 cycles and the code-packing module 524 still needs to deal with uncertain (and possibly long) waiting cycles to send out the compressed data, the CDC module 554 can be accelerated in a cost-efficient manner.

An innovative two-DCT coefficient scanning technique and a (relatively small) scratch memory 556 to store EOB locations can be provided. The two-DCT coefficient scanning scheme increases the performance up to two-fold. When the lower DCT coefficient value is zero, this factor of two increase in performance is maintained. The small scratch memory (e.g., a 30×33 bit RAM memory for the above example) can be used to store the DCT type (1 bit) and class number (2 bits) of each block in one video segment. The remaining 30 bits are the locations (6 bits each) for the five predetermined Qn cases. This allows such information to be stored for each block in the video segment (6 blocks per macro block, and five macro blocks per video segment). Thus, this information can be made available to later stages. The CDC module 554 can skip scanning AC coefficients after it reaches the EOB location for any block.

The two-DCT coefficient scanning scheme can operate as follows. DCT coefficients are analyzed two at a time in order to determine the run length of the current string of DCT coefficients. As the number of DCT coefficients in the run increases, a count is kept (the run length). When a single DCT coefficient is examined at a time, the run length is either increased or the run is indicated as having stopped (which then starts a new one). When taken two at a time, four possibilities exist. These four possibilities are shown in table 1 below:

TABLE 1

| DCT coefficient 1 | DCT coefficient 0 | Action |
|---|---|---|
| 0 | 0 | Increase counter (run length) by 2 |
| 0 | 1 | Run length stops; restart run length at 1 (not 0) |
| 1 | 0 | Run length stops and counter increased by 1 |
| 1 | 1 | Each gets a run length of 0 |

Thus, each possible combination can be handled easily by making the appropriate changes to the run length counter and/or storing the given run length. Moreover, because this is a relatively simple solution, performance is increased without a significant increase in circuit complexity.

While larger numbers of DCT coefficients can be analyzed at the same ime (e.g., 4, 8, 16, etc.), this increases the complexity of such circuitry due to the possibility of having runs of DCT coefficients contained within the block of DCT coefficients being analyzed. When only two DCT coefficients are taken at one time, however, such a run is less likely.

Combined, the later two techniques described herein offer markedly improved performance. Using such a scheme, the cycles used for CDC can be reduced effectively to almost half the amount required by other methods. Other benefits can include efficiency and a reduction in area requirements due to the lack of a separate memory for coefficients.

Figure 7:
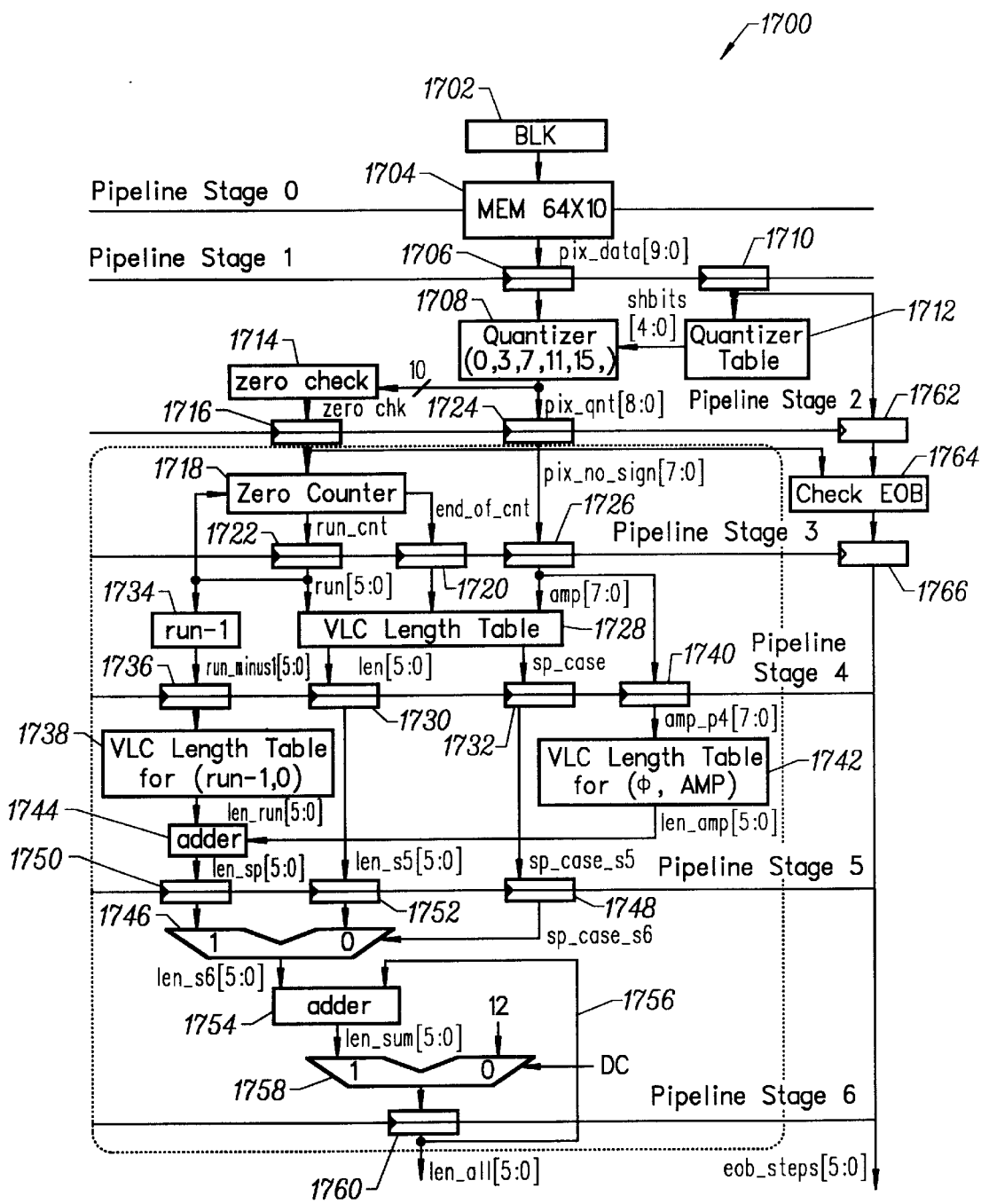
FIG. 7 illustrates a pipeline 1700 which is a more detailed exemplary embodiment of the length decision video encoder 518 of FIG. 3.

FIG. 7 illustrates a pipeline 1700 which is a more detailed exemplary embodiment of the length decision video encoder 518 of FIG. 3. The first two stages (0 and 1) read in the DCT coefficient information while the second stage quantizes the input based on five out of the sixteen possible Q-numbers. The reasons to choose only five of the Q-numbers is to reduce the number of computations and comparisons from $16^5=21048576$ down to $5^5=3125$. As a result, there are five individual paths to compute the lengths for each of the Q-numbers. The third stage checks the number of zeros coming in before a non-zero quantized number arrives. At the fourth stage, the encoded length is determined by looking up values from an encoding table. If the (run,amp) does not fall within the normal range, the fifth stage provides another two tables for the (run-1,0) and (0,amp) combination to get the new length. All the numbers are then summed up at the sixth stage and sent to the Q-number decision module.

More specifically, the pipeline 1700 of FIG. 7 receives a block of 8×8 of video data at block 1702. A memory block 1704 stores 64×10-bits of data. The memory block 1704 is coupled to a register 1706 via a 10-bit wide connection. A quantizer 1708 then applies the Q-numbers to each DCT coefficient received from the register 1706. As explained above, the smart encoder 520 of FIG. 3 can select the most appropriate Q-numbers and provide them to a register 1710. The register 1710 is coupled to a quantizer table 1712 which provides the selected Q-numbers to the quantizer 1708. The quantizer table 1712 can be any of the following tables 2–5. Tables 2–5 provide values in accordance with the DV standard. For example, the division operation can be done based on the number of shift bits once the appropriate Q-number, class, and area are provided. The quantizer 1708 divides the DCT coefficient values by the Q-numbers (i.e., shifts the DCT coefficient values by the number of shift bits given for each case). The quantizer 1708 provides its output to a zero check block 1714 which is configured to check whether the value output by the quantizer 1708 is zero. The zero check block 1714 checks all the bits for a given 10-bit DCT coefficient. The output of the zero check block 1714 is provided to a register 1716 which provides its output to a zero counter 1718. The zero counter 1718 is configured to increment for every zero detected. The zero counter 1718 provides an end of count signal to a register 1720 while it provides a run count to a register 1722. The end of count signal is provided when a non-zero value is encountered, at which point the run count is provided to the register 1722.

TABLE 2

Reduced encoding table for Q = 0.

| Class | Area | Shift bits |
|---|---|---|
| 0 | 0 | 1 |
| 0 | 1 | 2 |
| 0 | 2 | 2 |
| 0 | 3 | 3 |
| 1 | 0 | 2 |
| 1 | 1 | 3 |
| 1 | 2 | 3 |
| 1 | 3 | 4 |
| 2 | 0 | 3 |
| 2 | 1 | 3 |
| 2 | 2 | 4 |
| 2 | 3 | 4 |
| 3 | 0 | 3 |
| 3 | 1 | 3 |
| 3 | 2 | 4 |
| 3 | 3 | 4 |

TABLE 3

Reduced encoding table for Q = 3.

| Class | Area | Shift bits |
|---|---|---|
| 0 | 0 | 1 |
| 0 | 1 | 1 |
| 0 | 2 | 2 |
| 0 | 3 | 2 |
| 1 | 0 | 1 |
| 1 | 1 | 2 |
| 1 | 2 | 2 |
| 1 | 3 | 3 |
| 2 | 0 | 2 |
| 2 | 1 | 3 |
| 2 | 2 | 3 |
| 2 | 3 | 4 |
| 3 | 0 | 2 |
| 3 | 1 | 2 |
| 3 | 2 | 3 |
| 3 | 3 | 3 |

TABLE 4

Reduced encoding table for Q = 7.

| Class | Area | Shift bits |
|---|---|---|
| 0 | 0 | 0 |
| 0 | 1 | 0 |
| 0 | 2 | 1 |
| 0 | 3 | 1 |
| 1 | 0 | 0 |
| 1 | 1 | 1 |
| 1 | 2 | 1 |
| 1 | 3 | 2 |
| 2 | 0 | 1 |
| 2 | 1 | 2 |
| 2 | 2 | 2 |
| 2 | 3 | 3 |
| 3 | 0 | 1 |
| 3 | 1 | 1 |
| 3 | 2 | 2 |
| 3 | 3 | 2 |

TABLE 5

Reduced encoding table for Q = 11.

| Class | Area | Shift bits |
|---|---|---|
| 0 | 0 | 0 |
| 0 | 1 | 0 |
| 0 | 2 | 0 |
| 0 | 3 | 0 |
| 1 | 0 | 0 |
| 1 | 1 | 0 |
| 1 | 2 | 0 |
| 1 | 3 | 1 |
| 2 | 0 | 0 |
| 2 | 1 | 1 |
| 2 | 2 | 1 |
| 2 | 3 | 2 |
| 3 | 0 | 0 |
| 3 | 1 | 0 |
| 3 | 2 | 1 |
| 3 | 3 | 1 |

The quantizer 1708 also provides the divided DCT coefficient values to a register 1724 and 1726. The outputs of registers 1720, 1722, and 1726 are provided to a VLC length table 1728. The VLC length table 1728 can look up values from, for example, table 6 below. The VLC length table 1728 looks up appropriate values based on the run and amplitude of a selected block and provides its length information to a register 1730 and its space case to a register 1732. The space case can indicate whether a table value is being used.

TABLE 6

Length encoding table.

| Run | Amp. | Length |
|---|---|---|
| 0 | 1 | 3 |
| 0 | 2 | 4 |
| 1 | 1 | 5 |
| 0 | 3–4 | |
| 2 | 1 | 6 |
| 1 | 2 | |
| 0 | 5–6 | |
| 3–4 | 1 | 7 |
| 0 | 7–8 | |
| 5–6 | 1 | 8 |
| 2 | 2 | |
| 1 | 3–4 | |
| 0 | 9–11 | |
| 7–10 | 1 | 9 |
| 3–4 | 2 | |
| 2 | 3 | |
| 1 | 5–7 | |
| 0 | 12–17 | |
| 11–14 | 1 | 10 |
| 5–6 | 2 | |
| 3–4 | 3 | |
| 2 | 4–5 | |
| 1 | 8 | |
| 0 | 18–22 | |
| 5 | 3 | 11 |
| 3 | 4–5 | |
| 2 | 6 | |
| 1 | 9–11 | |
| 0–1 | 0 | |
| 6 | 3 | 12 |
| 4 | 4 | |
| 3 | 6 | |
| 1 | 12–14 | |
| 2–5 | 0 | |
| 7–10 | 2 | 13 |
| 7–8 | 3 | |
| 4 | 5 | |

TABLE 6-continued

Length encoding table.

| Run | Amp. | Length |
|---|---|---|
| 3 | 7 | |
| 2 | 7–11 | |
| 1 | 15–17 | |
| 6–62 | 0 | 13 |
| 0 | 23–255 | 16 |

The register 1722 can also provide the run count value to a run-1 block 1734 which provides its output to a register 1736. The output of the register 1736 is provided to a VLC length table for (run-1,0) block 1738 which is configured to look up the value for the given run-1 and zero amplitude. The table used for the block 1738 can be, for example, table 7 below.

TABLE 7

Length encoding table for amplitude = 0 case.

| Run | Amp. | Length |
|---|---|---|
| 0 | 0 | 11 |
| 1 | 0 | |
| 2 | 0 | 12 |
| 3 | 0 | |
| 4 | 0 | |
| 5 | 0 | |
| 6–62 | 0 | 13 |

At the time, the output of register 1726 (which includes the amplitude value) can be provided to a register 1740 and then to a VLC length table for (0,amp) block 1742. The table used for the VLC block 1742 can be, for example, table 8 below. The outputs of both the VLC length table for (run-1,0) block 1738 and the VLC length table for (0,amp) 1742 are provided to an adder 1744.

TABLE 8

Length encoding table for run = 0 case.

| Run | Amp. | Length |
|---|---|---|
| 0 | 0 | 11 |
| 0 | 1 | 3 |
| 0 | 2 | 4 |
| 0 | 3 | 5 |
| 0 | 4 | |
| 0 | 5 | 6 |
| 0 | 6 | |
| 0 | 7 | 7 |
| 0 | 8 | |
| 0 | 9 | 8 |
| 0 | 10 | |
| 0 | 11 | |
| 0 | 12 | 9 |
| 0 | 13 | |
| 0 | 14 | |
| 0 | 15 | |
| 0 | 16 | |
| 0 | 17 | |
| 0 | 18 | 10 |
| 0 | 19 | |
| 0 | 20 | |
| 0 | 21 | |
| 0 | 22 | |
| 0 | 23–255 | 16 |

At stage 5, the output of the register 1732 (i.e., the space case) is provided to a register 1748 and passed through to a multiplexer 1746 as a selection signal. The multiplexer 1746 also receives inputs from the adder 1744 and the register 1730 through registers 1750 and 1752, respectively. Accordingly, the multiplexer 1754 is configured to select the correct length based on whether a big table has been used or the (run-1,0) and (0,amp) tables have been combined. The output of the multiplexer 1746 is provided to an adder 1754 together with the feedback signal 1756. The adder 1754 is coupled to a multiplexer 1758 which receives a DC signal from the DCT block 512 of FIG. 3 as a control signal. The multiplexer 1758 also receives a value of 12 as input which is the DC length value for each block (i.e., the first DCT coefficient of each block). The DC signal ensures that the correct length value for DC input is taken into account for the first DCT coefficient. The output of the multiplexer 1758 is provided to a register 1760 which is then fed back to the adder 1754 to calculate the length values for given Q-numbers.

The register 1710 is also coupled to a register 1762 which is in turn coupled to a check EOB block 1764. also coupled to the register 1716 to receive the zero check result from the zero check block 1714. The check EOB block 1764 is configured to check for an EOB signal to provide proper control to configure the pipeline 1700 for a next block of data. A register 1766 receives the output of the check EOB block 1764 and passes it to the remaining circuitry.

Figure 8:
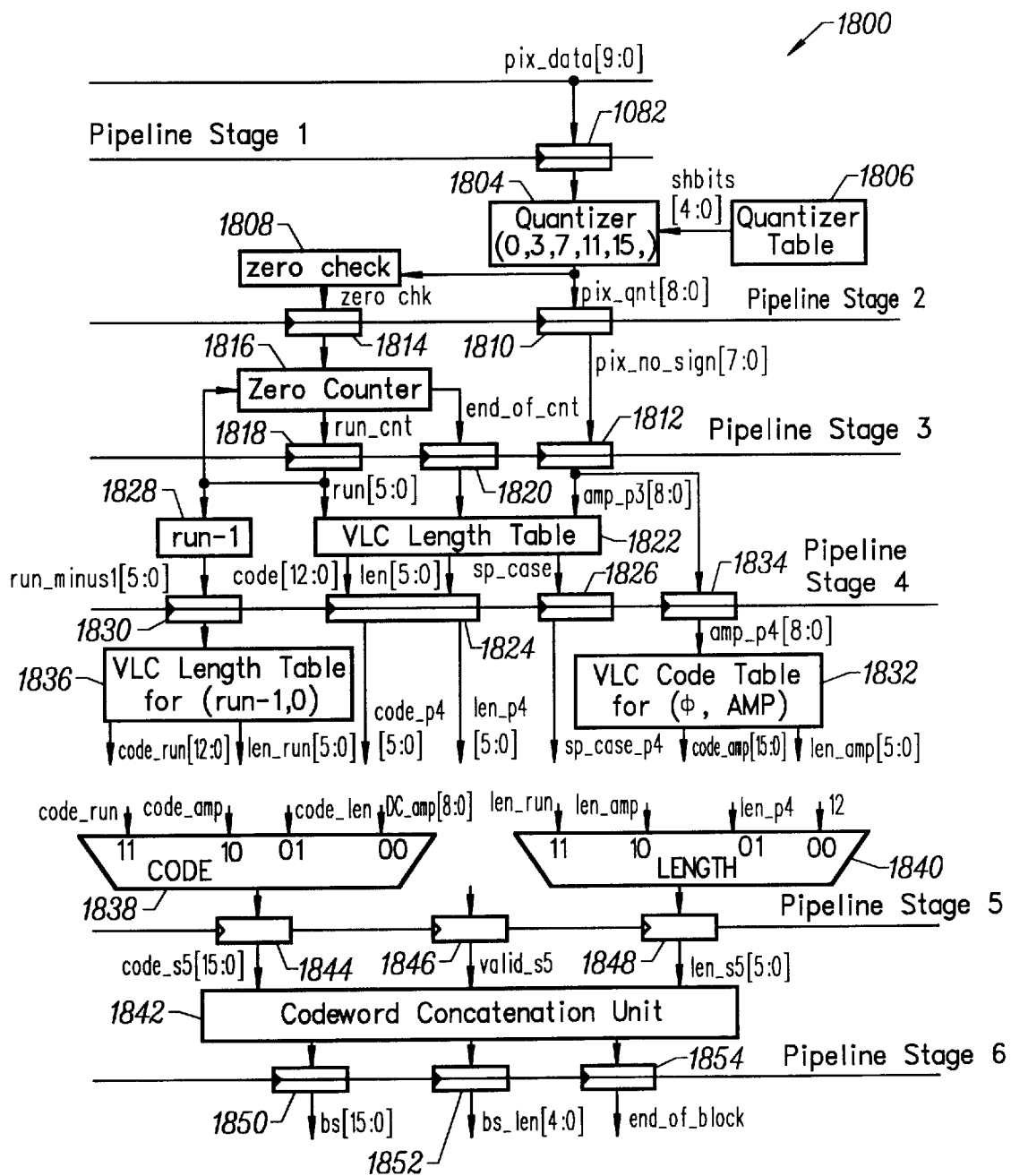
FIG. 8 illustrates a more detailed embodiment of the code decision module that can be implemented, for example, within the compression block 522 of FIG. 3.

FIG. 8 illustrates a more detailed embodiment of the code decision module that can be implemented, for example, within the compression block 522 of FIG. 3. A pipeline 1800 determines both lengths and code words for selected Q-numbers. The pipeline 1800 also concatenates individual code words into 16-bit words which are then sent to the code packing block 524. The operation of the first stage of the pipeline 1800 is similar to the $0^{th}$ and first stages of the pipeline 1700. The only main difference is that the pipeline 1800 reads two DCT coefficient values at a time from the memory buffers 514a–b of FIG. 3 rather than one DCT coefficient. This can potentially speed up the encoding process by a factor of two.

More specifically, data is provided to a register 1802 and then to a quantizer 1804 which is coupled to a quantizer table 1806. The quantizer 1804 is coupled to a zero check block 1808 which is configured to check for zeroes. The quantizer 1804 is also coupled to a register 1810 which provides amplitude values to a register 1812. The output of the zero check block is coupled to a register 1814 which is in turn coupled to a zero counter 1816. The zero counter 1816 provides two outputs to the run count register 1818 and the end of count register 1820, respectively. After stage 3, the outputs of the registers 1812, 1818, and 1820 are provided to a VLC code table 1822 which provides its code and length outputs to a register 1824 and its space case to a register 1826. At the same time, the output of the zero counter 1816 and the register 1818 are provided to a run-1 block 1828 which is turn coupled to a register 1830. A VLC code table for (0,amp) block 1832 receives the amplitude values from a register 1834 which receives its output from the register 1812. Similarly, a VLC code table for (run-1,0) block 1836 receives the output of the run-1 block 1828 through the register 1830. Again, the space case signal from the register 1826 will indicate whether the length and code information were obtained from a big table or the (run-1,0) and (0,amp) tables have been combined to acquire both values.

In stage 5, as indicated in FIG. 8, the outputs of the VLC code tables 1832 and 1836, together with the outputs of registers 1824 and 1826 are provided to two multiplexers 1838 and 1840. The multiplexer 1838 can be configured to handle the code information and the multiplexer 1840 can be configured to handle the length information. The outputs of the multiplexers 1838 and 1840 are provided to code word concatenation unit 1842 through registers 1844, 1846, and 1848. Finally, the output of the code word concatenation unit 1842 is provided to the code packing block 524 through registers 1850, 1852, and 1854.

Figure 9:
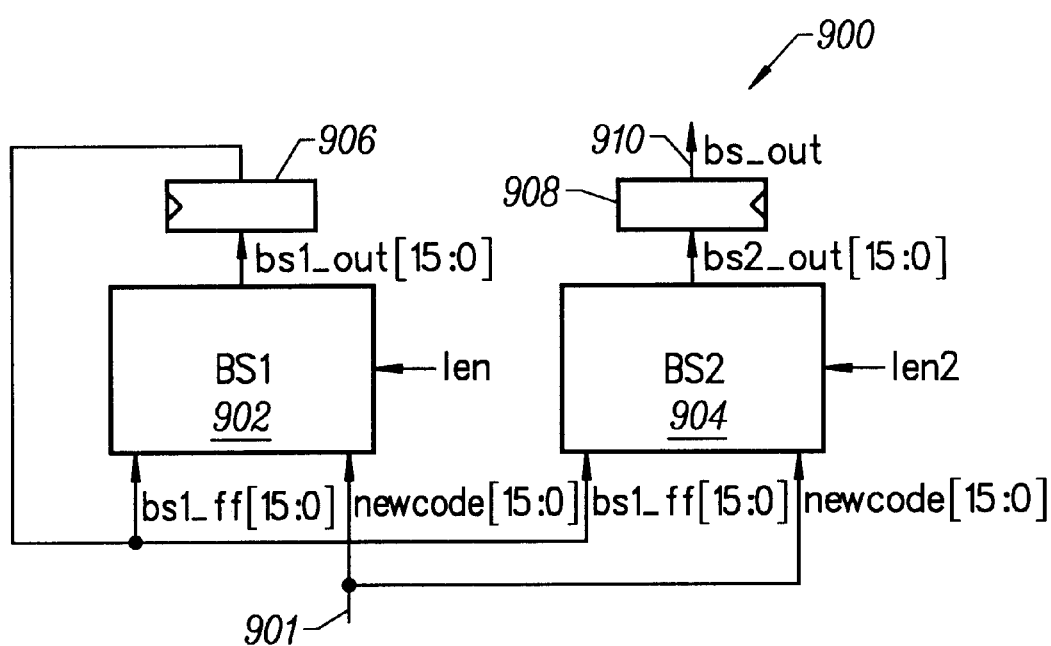
FIG. 9 illustrates a more detailed block diagram for a portion of the code word concatenation unit 1842 of FIG. 8.

FIG. 9 illustrates a more detailed block diagram for a portion of the code word concatenation unit 1842 of FIG. 8. The double barrel-shifter configuration 900 receives its input at node 901. Two barrel-shifters 902 and 904 receive the input from the node 901. The shifter 902 can be used as a right-aligned storage device which keeps holds of the newest data. The shifter 904 can be used as a left-aligned storage device which holds the older data. The barrel-shifters 902 and 904 are coupled to two registers 906 and 908 and provide a bitstream output at node 910.

The techniques of the present invention can therefore be readily implemented in an integrated circuit to allow the efficient compression and decompression of digitally encoded images, while consuming a minimal amount of integrated circuit area. The techniques of the present invention comply with the Digital Video Standard (the "Blue Book", or DV-SD standard). These techniques can also be of use in systems implementing other standards, such as the International Standards Organization's (ISO) Joint Photographic Experts Group (JPEG) standard, ISO DIS 10918-1, and is JPEG-compliant, as set forth in ISO DIS 10918-2. These standards are included by reference herein, in their entirety. Moreover, the techniques of the present invention can be understood in the framework of a JPEG image compression/decompression system, such as that outline in "JPEG Still Image Data Compression Standard" by W. B. Pennebaker and J. L. Mitchell, which is also included by reference herein, in its entirety.

Alternately, the techniques of the present invention can be implemented in a computer system. For example, the systems of FIGS. 5–8 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Also, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Additionally, even though the techniques of the present invention(such as specified in appendix B) have been discussed with respect to DCT transformation other types of transformations can also be utilized such as wavelet transform and vector quantization (VQ). Accordingly, for an understanding of the scope of the invention, reference should be made to the appended claims.

Also, having fully described certain of the preferred embodiments of the present invention, many other equivalent or alternative methods of implementing latency prediction according to the present invention will be apparent to those skilled in the art. Other signal processing applications that employ such bitstreams may benefit from the present invention. Also, the implementation shown in the figures is but one of many possible architectures which may be designed to take advantage of the method of the present invention. These equivalents and alternatives, and others, are intended to be included within the scope of the present invention.

What is claimed is:

1. A video encoder for run-length encoding video data having a plurality of segments, the video encoder comprising:

a length-decision coder configured to receive each segment of the video data and provide for each segment of the video data a plurality of length information based on a group of quantization factors;

a smart encoder coupled to the length decision coder and configured to receive the plurality of length information provided for each segment of the video data; the smart encoder further configured to select a plurality of best fit quantization factors for each segment of the video data; and a code-decision coder coupled to the smart encoder and configured to receive the plurality of best fit quantization factors selected for each segment of the video data and run-length encode each segment of the video data in accordance with the best fit quantization factors selected for that segment of the video data.

2. The video encoder of claim 1 wherein the selected group of quantization factors is in accordance with DV Standard.

3. The video encoder of claim 1 wherein the selected group of quantization factors includes 0, 3, 7, 11, and 15.

4. The video encoder of claim 1 further including a plurality of storage components for storing the video data.

5. The video encoder of claim 4 wherein the plurality of storage components are configured to act as back and forth memory buffers.

6. The video encoder of claim 1 wherein the length-decision coder provides five lengths for each macro block of the video data.

7. The video encoder of claim 1 wherein the smart encoder selects five quantization factors for each video segment of the video data.

8. The video encoder of claim 1 further including a code packing block coupled to the code-decision coder, the code packing block configured to arrange the video data into a bitstream.

9. The video encoder of claim 8 wherein the code packing block is further coupled to the smart encoder, wherein the smart encoder provides information about the video data to the code packing block.

10. The video encoder of claim 1 further including a DCT-type decision block coupled to a DCT block, the DCT-type decision block configured to select a DCT-type to apply to the video data and the DCT block applying the selected DCT-type to the video data.

11. The video encoder of claim 10 wherein the DCT-type is selected from a group comprising 2×4×8 DCT and 8×8 DCT.

12. A video encoder for run-length encoding video data, the video encoder comprising:

a length-decision coder, the length-decision coder configured to receive the video data and provide length information based on a selected group of quantization factors;

a smart encoder coupled to the length-decision coder, the smart encoder configured to receive the length information and select a plurality of best fit quantization factors;

a code-decision coder coupled to the smart encoder, the code-decision coder configured to receive the plurality of best fit quantization factors and run-length encode the video data;

a plurality of storage components coupled to at least one of the length-decision coder, the smart encoder, and the code-decision coder for storing the video data; and a code packing block coupled to the code-decision coder, the code packing block configured to arrange the video data into a bitstream.

* * * * *

UNITED STATES PATENT AND TRADEMARK OFFICE
CERTIFICATE OF CORRECTION

PATENT NO.    : 6,594,398 B1                                    Page 1 of 1
DATED         : July 15, 2003
INVENTOR(S)   : Wu et al.

It is certified that error appears in the above-identified patent and that said Letters Patent is hereby corrected as shown below:

Drawings,
Replace FIG. 4 with the following drawing to show unpacking block 613, video decoder 624 and audio shuffling block 622, described in the written description at column 6, line 56 through column 7, line 48.

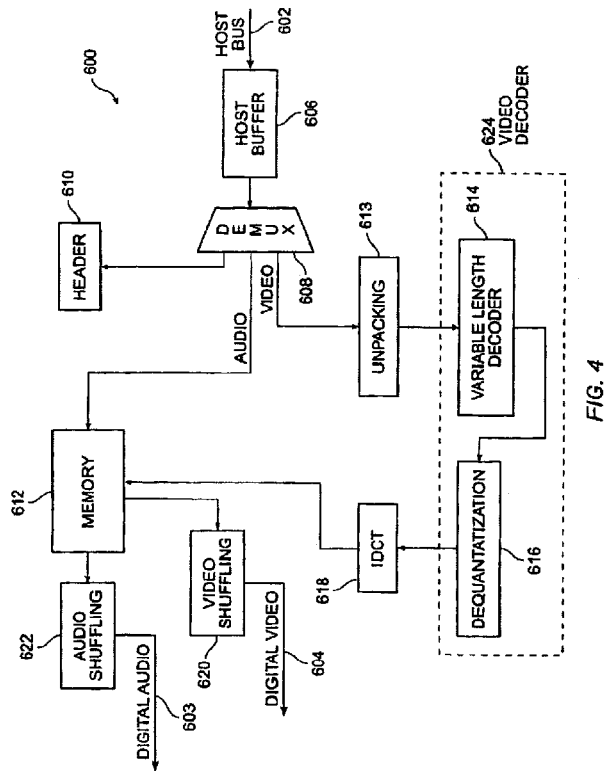

FIG. 4

Signed and Sealed this

Twenty-third Day of August, 2005

JON W. DUDAS
*Director of the United States Patent and Trademark Office*